Dec. 6, 1955   B. STORSAND   2,726,360
MULTISTAGE ASYNCHRONOUS MOTOR GROUP
Filed Dec. 20, 1951
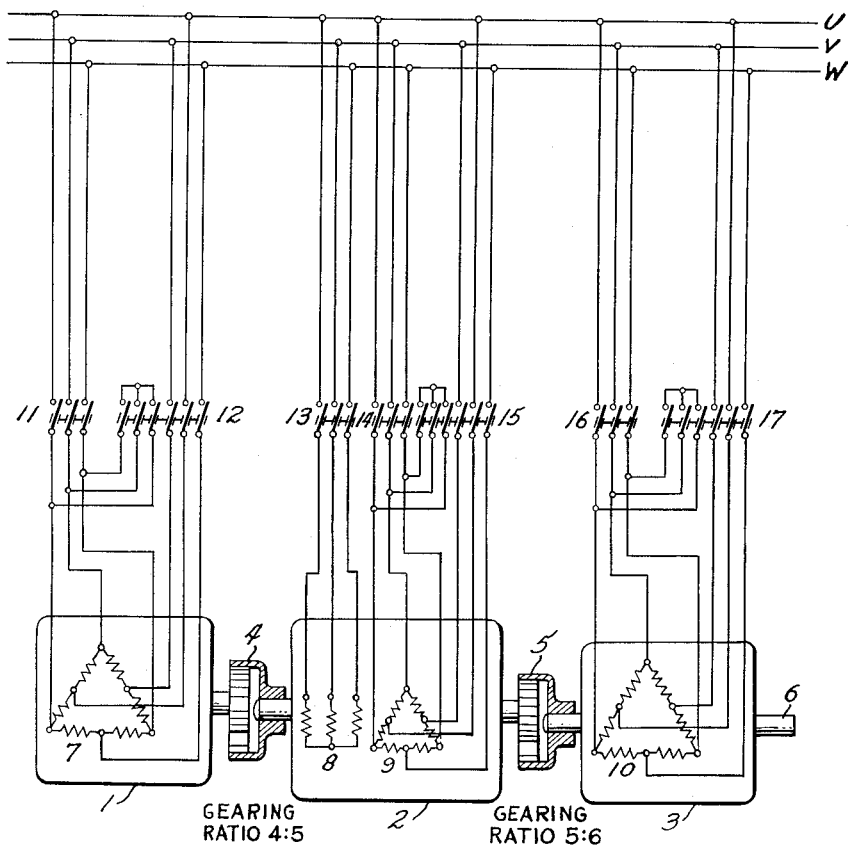
Bjarne Storsand,
INVENTOR.
BY Benjamin Tomas.
Atty.

United States Patent Office
2,726,360
Patented Dec. 6, 1955

2,726,360
MULTISTAGE ASYNCHRONOUS MOTOR GROUP

Bjarne Storsand, Zurich, Switzerland, assignor to Ateliers de Construction Oerlikon, Zurich-Oerlikon, Switzerland, a corporation of Switzerland Application December 20, 1951, Serial No. 262,629

8 Claims. (Cl. 318—46)

The present invention relates to polyphase alternating current motors and more particularly to multistage asynchronous motor combination.

In order to attain a favorably graded range of output speeds in an assemblage of pole changing asynchronous motors two or more of such motors are combined by having their shafts connected mechanically to each other by a series of speed-changing transmissions; and their input circuits electrically connectable to a power source by suitable switching means for selective energization of such motors.

A particularly favorable grading of the output speeds may be attained when, according to the present invention, a combination is provided consisting of three pole changing motors having the same minimum number of poles, the shafts of which motors are coupled mechanically by transmissions of gear ratios in such a way that three uniformly spaced velocity stages arise, the motors being changeable to at least a further greater number of poles amounting to double, three or four times the number of the smallest number of poles, which produces a further series of velocity stages that is added uniformly to the first.

Appropriately intermediate gears with the transmission ratios of 6:5 and 5:4 are employed for the purpose. If in addition the three motors are changeable to two or four poles we obtain by means of a corresponding selective connection the following series of output speeds at, for example, 50 cycles:

3000, 2500, 2000 R. P. M. for the motors with two poles, or 1500, 1250, 1000 R. P. M. for the motors with four poles.

If it is desired, especially for the use of the device in driving vehicles, to continue this series of velocity stages in a downward direction, one of the three motors may be provided with a larger number of poles or also with several which preferably amount to three, four, several times the smallest number of poles. Thus, for example, it is possible to attain with two, four and eight poles for the motor located in the middle of the assemblage an additional starting R. P. M. of 625 at 50 cycles, which can be advantageously added to the previously indicated series of speed steps.

The single figure of drawing is a diagram illustrating the invention.

In the drawing 1 and 3 are motors with two and four poles, and 2 is a motor with two, four and eight poles. Between the shafts of motors 1 and 2 there is inserted a gear 4 with a transmission ratio of 6:5, and between the shafts of motors 2 and 3 there is inserted a gear 5 with a transmission ratio 5:4. 6 is the output drive shaft of the assemblage. Motors 1 and 3 have a "delta" connection for four poles, connectable to busbars U, V, W of a three-phase power supply system by means of switches 11 and 16, respectively, said connection being changeable to two poles in double "star" connection by means of switches 12 and 17, respectively, in a way well known to those skilled in the art. The middle motor 2 has two separate windings 8 and 9, winding 8 being a "star" connected eight pole winding, and winding 9 a four pole winding changeable to two poles as used for motors 1 and 3. 13, 14 and 15 are the corresponding switches. The sequence of the connections, with the resulting output speeds at the driving axle 6 are shown in the following table:

| Step | Switch No. | | | | | | | Synchronous Speed at Axle 6 (50 cycles/sec.) |
|---|---|---|---|---|---|---|---|---|
|  | 11 | 12 | 13 | 14 | 15 | 16 | 17 |  |
|  |  |  |  |  |  |  |  | rev./min. |
| 1 |  |  | X |  |  |  |  | 600 |
| 2 | X |  |  |  |  |  |  | 1,000 |
| 3 |  |  |  | X |  |  |  | 1,250 |
| 4 |  |  |  |  |  | X |  | 1,500 |
| 5 |  | X |  |  |  |  |  | 2,000 |
| 6 |  |  |  |  | X |  |  | 2,500 |
| 7 |  |  |  |  |  |  | X | 3,000 |

Moreover, by using three motors switching without interruption of movement may be attained, because the disconnection of one motor always takes place only after the connection of the next motor.

Each of the transmissions preferably consists of spur gears with internally meshing teeth, which makes for good efficiency and a compact construction. Gear ratios for the transmissions 4 and 5 other than those mentioned can be chosen, if desired, without departing from the principles of the invention.

Having thus described my invention, I claim:

1. Multistage asynchronous motor group, which consists of three pole changing motors each having a shaft and the same minimum number of poles, means comprising intermediate gears mechanically coupling said shafts in series with transmission ratios yielding uniform stages of velocity in one of said shafts constituting the output drive shaft and means for changing the motors to an additional greater number of poles amounting to a multiple of the smallest pole number, from which results a further series of velocity stages in addition to the first in said output drive shaft.

2. Multistage asynchronous motor group as in claim 1, in which the three motors are changeable to two and four poles.

3. Multistage asynchronous motor group as in claim 1, in which one of the motors is changeable to two and six poles and the rest to two and four poles.

4. Multistage asynchronous motor group as in claim 1, in which one of the motors is changeable to two and eight poles and the rest are changeable to two and four poles.

5. Multistage asynchronous motor group as in claim 1, in which one of the motors is changeable to two, four and eight poles and the rest are changeable to two and four poles.

6. Multistage asynchronous motor group as in claim 1, in which the transmission is provided with internal gearing.

7. A polyphase alternating current multistage asynchronous motor device comprising the combination of three asynchronous alternating current motors having separate shafts, and means comprising transmission gears mechanically coupling the shafts of said motors in series with uniformly stepped ratios from the first to the second and from the second to the third, the shaft of said third motor constituting the output drive shaft of the device, said motors having the same minimum number of poles, the stepped ratios of the shaft coupling gears being 6:5 and 5:4 respectively, and means for changing the poles of each of the motors in pole pairs to change the speed thereof in steps.

8. A multistage asynchronous motor device comprising three pole-changing motors each having a shaft and provided with stator windings for at least two different speeds, gears mechanically coupling the shaft of the first of said motors to the shaft of the second and establishing a predetermined gear ratio between said coupled shafts, other gears mechanically coupling the shaft of the second motor to the shaft of the third and establishing a predetermined gear ratio between said coupled shafts, said third motor shaft being the output shaft of the device, and means for switching the motors into operation in selected succession so that each motor operating at a selected one of its available speeds may be caused to become individually effective upon said output shaft.

References Cited in the file of this patent

UNITED STATES PATENTS

| | | |
|---|---|---|
| 774,018 | Wust-Kunz | Nov. 1, 1904 |
| 2,653,283 | Feldhausen | Sept. 22, 1953 |

FOREIGN PATENTS

| | | |
|---|---|---|
| 554,038 | Great Britain | June 17, 1943 |